United States Patent [19]

Miyamatsu et al.

[11] Patent Number: 4,526,287
[45] Date of Patent: Jul. 2, 1985

[54] SHOCK-RESISTANT EASILY-OPENABLE VESSEL CLOSURE

[75] Inventors: Yasunori Miyamatsu, Ayase; Yasuo Kaga; Masanori Aizawa, both of Yokohama; Kazuhisa Ishibashi, Tokyo; Hiroshi Ueno, Yokosuka, all of Japan

[73] Assignee: Toyo Seikan Kaisha Ltd., Tokyo, Japan

[21] Appl. No.: 554,100

[22] Filed: Nov. 21, 1983

[30] Foreign Application Priority Data

Nov. 19, 1982 [JP] Japan .................. 57-202041

[51] Int. Cl.³ .................. B65D 17/50; B65D 41/02
[52] U.S. Cl. .................. 220/260; 220/359
[58] Field of Search .................. 220/260, 359, 270; 156/69; 53/477; 229/7 R; 222/541

[56] References Cited

U.S. PATENT DOCUMENTS 4,397,401 8/1983 Ueno et al. .................. 220/359

Primary Examiner—George T. Hall
Attorney, Agent, or Firm—Sherman & Shalloway

[57] ABSTRACT

Disclosed is an easily-openable vessel closure comprising a can end member having a preformed opening and an easily-tearable opening tab arranged on the outer side of the can end member to cover the opening and adhere closely to the peripheral portion of the can end member contiguous to the opening, wherein the opening of the can end member has such a size and shape that the opening is longer in the radial direction of the can end member, the opening extends from the inside of a circle concentric with the can end member, which has a diameter 0.35 time the seaming diameter of the can end member, to the point close to the outer periphery of the can end member and the portion defined by the contour of the opening and said circle involves a circle having a diameter of 5 mm, and wherein a thermoplastic resin coating having a-shaped section is formed on the cut edge of the opening of the can end member and the contiguous peripheral portion of the can end member and the opening tab is bonded to the can end member through said resin coating.

3 Claims, 7 Drawing Figures

SHOCK-RESISTANT EASILY-OPENABLE VESSEL CLOSURE

BACKGROUND OF THE INVENTION (1) Field of the Invention

The present invention relates to an easily-openable vessel closure. More particularly, the present invention relates to an easily-openable vessel closure having excellent shock resistance and an opening shape suitable for drinking a liquid content.

(2) Description of the Prior Art

A vessel closure comprising a can end member having a preformed opening and an easily-tearable opening tab arranged on the outer side of the can end member to cover said opening and adhere closely to the peripheral portion of the can end member contiguous to the opening is known as an easily-openable vessel closure. Bonding of the opening tab to the can end member is accomplished by using a pressure-sensitive adhesive or by heat sealing with a hot-adhesive resin. In each case, if insufficient adhesion or peeling is caused between the opening tab and the peripheral portion contiguous to the opening, a serious problem of insufficient sealing due to leakage arises.

Various proposals have been made to protect the cut edge of the opening and improve the pressure-resistant bonding between the opening tab and the peripheral portion of the can end member contiguous to the opening in easily-openable vessel closures of this type. However, trials have hardly been made to protect the bonded portion between the opening tab and the peripheral portion contiguous to the opening from shocks of falling or the like

SUMMARY OF THE INVENTION

It is therefore a primary object of the present invention to provide an easily-openable vessel closure having an opening shape suitable for drinking a liquid content, which opening shape can protect the bonded portion between the opening tab and the peripheral portion contiguous to the opening from shock due falls or the like.

Another object of the present invention is to provide an easily-openable vessel closure in which the bond between the opening tab and the peripheral portion contiguous to the opening is prevented from deterioration or peeling and a good seal is maintained even if the can end member of a packed can is subjected to shock due to falls or the like.

Still another object of the present invention is to provide an easily-openable vessel closure in which breakage of the protection of the cut edge of the opening is assuredly prevented even if the can end member is subjected to shock.

More specifically, in accordance with the present invention, there is provided an easily-openable vessel closure comprising a can end member having a preformed opening and an easily-tearable opening tab arranged on the outer side of the can end member to cover the opening and adhere closely to the peripheral portion of the can end member contiguous to the opening, wherein the opening of the can end member has such a size and shape that the opening is longer in the radial direction of the can end member, the opening extends from the inside of a circle concentric with the can end member, which has a diameter 0.35 time the seaming diameter of the can end member, to the point close to the outer periphery of the can end member and the portion defined by the contour of the opening and said circle involves a circle having a diameter of 5 mm, and wherein a thermoplastic resin coating having a-shaped section is formed on the cut edge of the opening of the can end member and the contiguous peripheral portion of the can end member and the opening tab is bonded to the can end member through said resin coating.

DETAILED DESCRIPTION OF THE PREFERRED EMBODIMENTS

Figure 1:
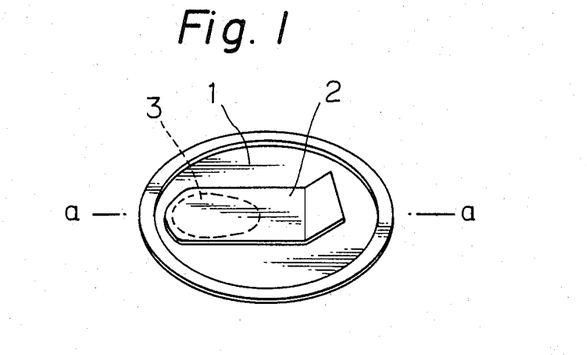
FIG. 1 is a perspective view showing an easily-openable vessel closure of the present invention, seen from the side of the outer surface.
Figure 2:
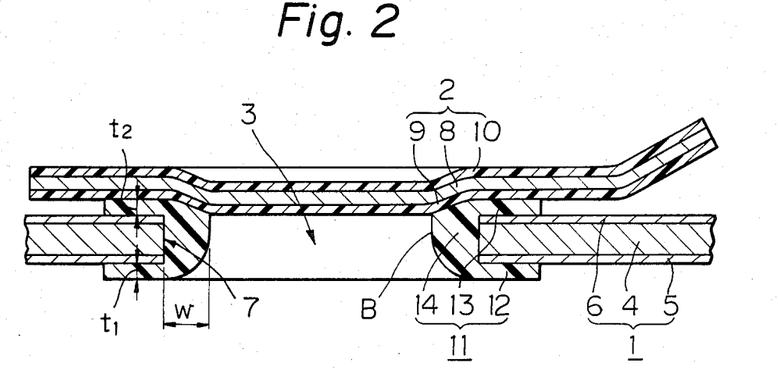
FIG. 2 is an enlarged view showing the section taken along the line a—a of the vessel closure shown in FIG. 1.
Figure 3:
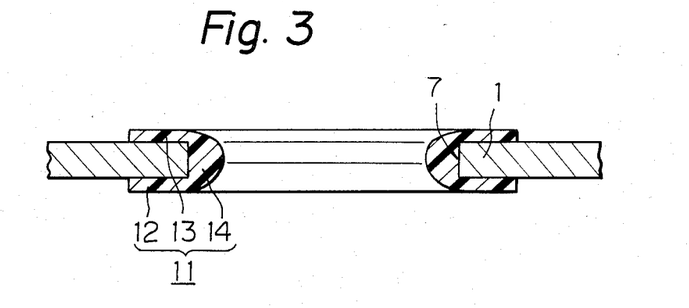
FIG. 3 is a similar sectional view illustrating the state where the opening tab is peeled from the vessel closure shown in FIG. 2.

Referring to FIGS. 1 through 3 showing the entire structure of the easily-openable vessel closure of the present invention, this vessel closure comprises a can end member represented as a whole by reference numeral 1 and an opening tab represented as a whole by reference numeral 2. The can end member 1 has a preformed opening 3, and the opening tab 2 is arranged to cover the opening 3 and adhere closely to the peripheral portion of the can end member contiguous to the opening 3.

The can end member 1 comprises a metal substrate and protecting coatings 5 and 6 formed on the inner and outer surfaces of the metal substrate 4. The metal substrate 4 is exposed on the cut edge 7 of the opening 3. Since this exposed portion falls in contact with the content, there arises a problem of corrosion of this exposed portion or dissolution of the metal from this exposed portion. The opening tab 2 ordinarily comprises a substrate alone or in combination with a hot-adhesive resin layer or coating 9 located on the can end member side of the substrate 8. A protective resin coating layer 10 may be formed on the outer surface of the substrate 8. The opening tab 2 is bonded closely to the can end member 1 by fusion-bonding the hot-adhesive resin layer or coating 9 to a film layer 13 of the can end member 1, whereby sealing is accomplished.

A protective coating having a-shaped section, which is represented as a whole by reference numeral 11, is formed to cover the cut edge 7 of the opening 3 of the can end member 1. This protective coating 11 is composed of a thermoplastic resin which is heat bondable and comprises a film layer 12 heat-bonded to the peripheral portion of the inner surface side of the opening 3, a film layer 13 heat-bonded to the peripheral portion of the outer surface side of the opening 3 and a projecting covering portion 14 which is heat-bonded to the cut 13.

One of the important features of the present invention is that the resin coating 11 having a-shaped section is formed, by that bonding, on the cut edge 7 of the opening 3 of the can end member 1 and the contiguous peripheral portion and the opening tab 2 is bonded to the can end member 1 through this coating 11 and the opening 3 is formed to have a specific shape and size described below.

Figure 4:
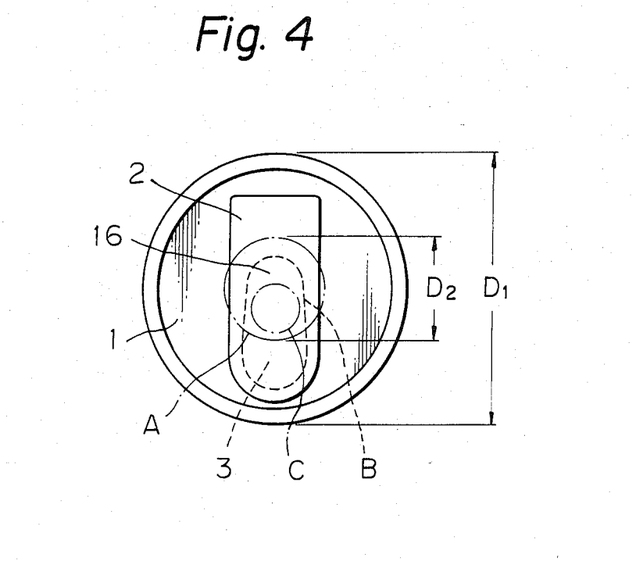
FIG. 4 is a diagram illustrating the shape of the opening of the easily-openable vessel closure of the present invention.

Referring to FIG. 4 showing the shape of the opening 3 of the easily-openable vessel closure of the present invention, the opening 3 is longer in the radial direction of the can end member 1, the opening 3 extends from the inside of a circle A concentric with the can end member 1, which has a diameter $D_2$ of $0.35 \times D_1$ where $D_1$ stands for the seaming diameter of the can end member 1, to the point close to the outer periphery of the can end member 1, and the portion 16 defined by the contour B of the opening 3 and the circle A involves a circle C having a diameter of 5 mm.

In view of the easy openability, the easiness of drinking of the liquid content through the opening 3 and the easiness of discharge of the content through the opening 3, it is important that the opening 3 should be longer in the radial direction of the can end member 1 as shown in FIG. 4. From the results of the organoletpic tests made by the present inventors, it was found that when the opening 3 is formed to have such a size and shape that the opening 3 extends from the inside of the circle A having a diameter $D_2$ of $0.35 \times D_1$ to the point close to the outer periphery of the can end member 1, best easiness of drinking of the liquid content is obtained.

From the results of the invented falling test of a can formed by seaming an easily-openable vessel closure of the above-mentioned type to a can body, it was found that a high impact force is generated locally at a specific position of the vessel closure (causing navellike projection of the opening tab), and that this position is located in the central portion of the can end member, namely, the portion surrounded by the circle A having a diameter $D_2$ of $0.35 \times D_1$ (practically, the opening tab covering this portion), though the position varies to some extent according to the shape and size of the opening. In the case where the bonded portion between the protective adhesive layer 11 and opening tab 2 is included in this high impact force-generated area or is contiguous to this area, adhesion failure or peeling is readily caused by this impact force, resulting in leakage.

If this opening 3 is located outside the circle A, there is no risk of adhesion failure caused by the impact force, but the shape of the opening becomes unsuitable for drinking. If the inner end portion of the opening 3 is located inside the circle A, the easiness of drinking is improved but a fatal defect of adhesion failure by the impact force, resulting in leakage, is brought about.

According to the present invention, these disadvantages can be eliminated very effectively. In the present invention, the portion 16 defined by the contour B of the opening 3 and the above-mentioned circle A has a shape including a circle C having a diameter of 5 mm and the adhesive protecting coating 11 having a-shaped section is formed in the peripheral portion of the opening 3. By dint of this feature, even if a high impact force is generated locally on the opening tab 2 covering the opening 3, occurrence of adhesion failure or peeling is prevented in the bonded portion between the opening tab 2 and the protecting adhesive layer 11 of the can end member 1. If the diameter of a largest circle that can be included in the above-mentioned portion 16 is smaller than 5 mm, as is seen from the Examples given hereinafter, leakage is caused during the transportation and distribution or under a falling shock that should practically be resisted.

Furthermore, when the heat bonding protection coating 11 of a-shaped section is not formed on the opening cut edge of the can end member 1 and the contiguous peripheral portion and the opening tab 2 is heat-bonded on the can end member 1 through only the heat adhesive layer 13 of the film layer, even if the diameter of the circle C which involves said portion 16 is 5 mm, leakage is similarly caused from a falling shock of the above-mentioned level.

In the present invention, the diameter of the circle C included in the portion 16 of the opening 3 defined by the contour B of the opening 3 and the circle A is at least 5 mm, the hot-adhesive protective coating 11 having a-shaped section is formed on the periphery of the opening 3 of the can end member 1 and the opening tab 2 is heat-bonded to the can end member 1 through this coating 11. The fact that leakage due to a shock is prevented by dint of the above feature was empirically found based on repetition of experiments. The reason has not been elucidated. However, it is believed that this advantage will be attained according to the following mechanism.

As pointed out hereinbefore, it is at the area surrounded by the circle A that the local impact force is concentratedly generated, and projecting deformation of the opening tab is caused by this impact force to such an extent that the size of the largest rising portion is 5 mm at most. When the hot-adhesive protecting coating 11 is formed on the cut edge of the opening of the can end member 1 and the contiguous portion, the coating 14 projecting inward from the cut edge 7 is present, though this projecting coating 14 is not present when the hot-adhesive layer is formed only on the portion where the peripheral portion of the cap end member contiguous to the opening and the portion to which the opening tab 2 are overlapped. Accordingly, if the shape and size of the opening are adjusted so that the diameter of the included circle C is 5 mm, large deformation generated by a large shock is prevented from extending to the bonded portion between the opening tab 2 and the can end member 1, while a small shock is moderated or damped by the projecting coating 14.

In the present invention, by forming the opening 3 to have the above-mentioned shape and also by forming the hot-adhesive protecting coating 11 having a-shaped section on the periphery of the opening 3, adhesion failure or peeling is prevented in the bonded portion between the opening tab 2 and the can end member 1. Furthermore, there can be attained an effect of safely protecting the covering for the cut edge of the opening of the can end member 1 even if an impact force is applied.

Figure 5:
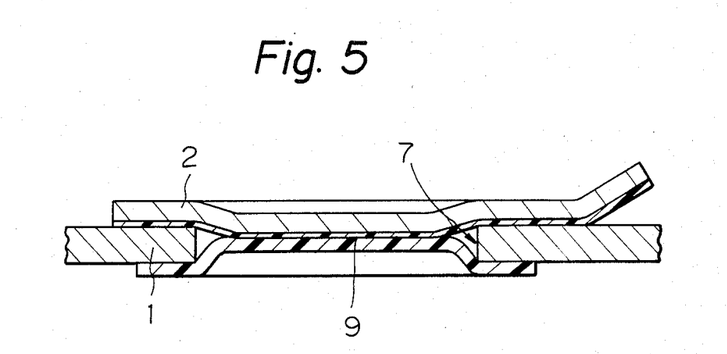
FIG. 5 is a sectional view showing a conventional vessel closure.

For example, according to the conventional technique, as shown in FIG. 5, a protecting resin layer 15 is applied to the inner side of the can end member 1, that is, on the side opposite to the side where the opening tab 2 is arranged, whereby corrosion of the cut edge of the opening of the can end member 1 is prevented. However, in the case where the above-mentioned local impact force is concentratedly generated on the opening tab 2, not only the above-mentioned leakage but also breakage or cracking of the inner surface protecting resin layer 15 is caused, and therefore, dissolution of the metal from the cut edge 7 and corrosion of the cut edge 7 are readily advanced. In the present invention, the coating for protecting the cut edge 7 of the opening 3 of the can end member 1 is a coating 11 having a-shaped section, which is continuous in the circumferential direction but is not continuous in the radial direction, and the shape and size of the opening 3 are adjusted so that the diameter of the above-mentioned included circle C is at least 5 mm. By dint of this feature, in the present invention, even if a certain shock is applied, breakage or cracking of the protecting resin coating 11 is prevented, and furthermore, a large shock is prevented from being given to this coating 11, whereby corrosion of the cut edge 7 or dissolution of the metal from the cut edge 7 is prevented.

The shape of the opening 3 is freely changed so far as the above-mentioned requirements are satisfied, and for example, circular, ellipsoidal, egg-like, rain drop-like, oval and gourd-like shapes may be adopted, though shapes that can be adopted in the present invention are not limited to those exemplified above.

Figure 6:
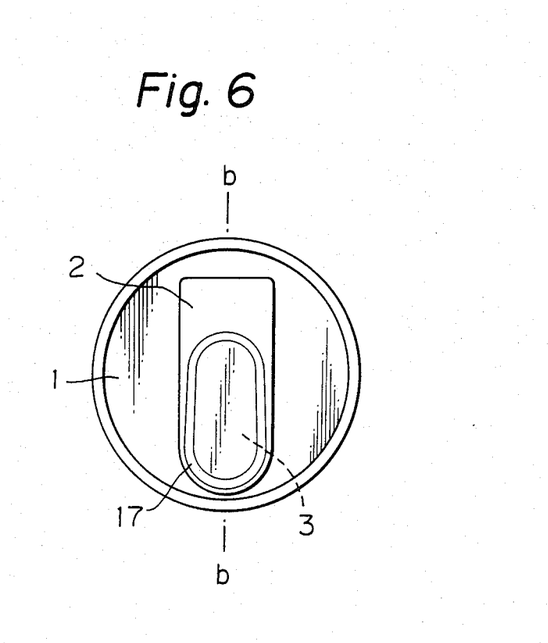
FIG. 6 is a plan view showing a preferred embodiment of the easily-openable vessel closure of the present invention.
Figure 7:
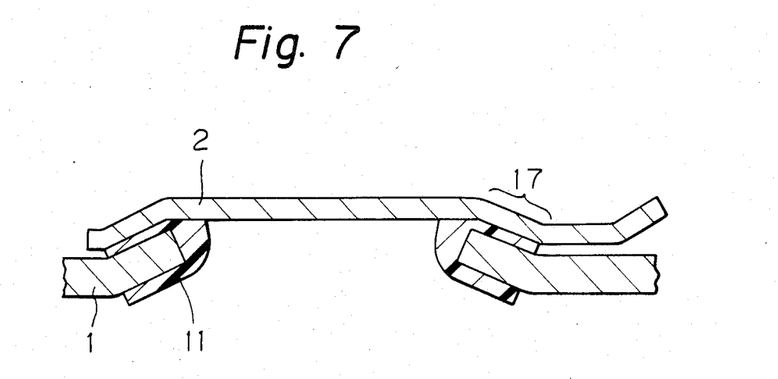
FIG. 7 is an enlarged view showing the section taken along the line b—b of the vessel closure shown in FIG. 6.

In accordance with one preferred embodiment of the present invention, the shock resistance can further be improved by forming the opening 3 to have a shape described below. This embodiment is illustrated in FIGS. 6 and 7. Referring to FIGS. 6 and 7, the peripheral portion 17 of the can end member 1 contiguous to the opening 3 is tapered and projected to the outer side. In the case where the opening tab 2 is bonded to this tapered peripheral portion 17, even if projecting deformation is caused in the opening tab 2, the stress applied between the opening tab 2 and the tapered peripheral portion 17 is not a peeling force but a shear stress, with the result that peeling of the bonded portion is effectively prevented.

It is preferred that the width of the tapered peripheral portion 17 be 0.5 to 5 mm, especially 1 to 3 mm, and that the angle of the projection of the tapered peripheral portion from the horizontal plane be 10° to 40°, especially 15° to 30°.

In the present invention, the easily-openable vessel closure is prepared by heat-bonding the opening tab to the can end member having a preformed opening having the above-mentioned size and shape. Accordingly, the same metal blank as used for a can body may be used for the can end member without any limitation concerning the processing of the metal blank, and therefore, the used empty can can be recovered and used again as the resource effectively.

As the metal blank for the can end member, there can be mentioned an untreated steel plate (black plate), electrolytically deposited and melt-deposited steel plates such as tinplate, a zinc-deposited steel plate and chromium-deposited steel plate, chemically treated steel plates such as a chromate-treated steel plate and a phosphate-treated steel plate, and TFS (a steel plate electrolytically treated in chromic acid). Furthermore, a plate of a light metal such as an aluminum plate may be used. It is preferred that the thickness of the metal blank be 0.10 to 0.70 mm, especially 0.15 to 0.55 mm.

The metal blank, especially a surface-treated steel plate, may be used in the uncoated state, but it is ordinarily preferred that the inner surface and/or the outer surface be coated. For formation of this protective coating, there may be used lacquers of thermosetting resins such as a phenol-formaldehyde resin, a furan-formaldehyde resin, a xylene-formaldehyde resin, a ketone-formaldehyde resin, a urea-formaldehyde resin, a melamine-formaldehyde resin, an alkyd resin, an unsaturated polyester resin, an epoxy resin, a bismaleimide resin, a triallyl cyanurate resin, a thermosetting acrylic resin, a silicone resin and an oleoresin, lacquers of thermoplastic resin such as a vinyl chloride-vinyl acetate copolymer, a partially saponified vinyl chloride-vinyl acetate copolymer, a vinyl chloride-maleic acid copolymer, a vinyl chloride-maleic acid-vinyl acetate copolymer, an acrylic polymer and a saturated polyester, and mixtures thereof.

As pointed out hereinbefore, the opening tab comprises a substrate alone or in combination with a thermoplastic resin layer or coating formed on one side of the substrate. The substrate should have a good flexibility and a good gas barrier property. Accordingly, an aluminum foil, a tinplate foil, a steel foil, an iron foil or a similar metal foil is advantageously used. As the gas barrier substrate, there can be used not only these metal foils but also films or metal-vacuum-deposited films of high gas barrier resins such as a saponified ethylene-vinyl acetate copolymer, a vinylidene chloride resin, a vinyl chloride resin, a high nitrile resin and a polyvinyl alcohol resin.

Any of thermoplastic resins having a hot adhesiveness to the protective coating 11 can be used as the hot-adhesive resin. It is ordinarily preferred that a hot-adhesive resin having a melting or softening point of 30° to 300° C., especially 70° to 260° C., be used. As a preferred example of this hot-adhesive resin, there can be mentioned a thermoplastic polymer having on the main chain or the side chain a carbonyl group derived from a carboxylic acid, a carboxylic acid salt, a carboxylic anhydride, a carboxylic acid ester, a carboxylic acid amide, a ketone, a carbonic acid ester or urea. Best combination of the heat bondability and corrosion resistance can be obtained when a thermoplastic polymer containing carbonyl groups at a concentration of 12 to 1400 milliequivalents, especially 50 to 1200 milliequivalents, per 100 g of the polymer is used. As preferred examples of the polymer, there can be mentioned polyamides, copolyamides, thermoplastic polyesters, thermoplastic copolyesters and acid-modified olefin resins.

For formation of the coating, the same resin lacquers as described hereinbefore with respect to the can end member may be used.

In the present invention, the same resins as described hereinbefore with respect to the opening tab may be used for the protecting coating layer 11. In this coating, it is preferred that the protecting coating portion 14 should have a projecting size (w) 0.1 to 500 times, especially 0.5 to 100 times, the thickness ($t_1$) of the film layer portion 12 inwardly of the cut edge 7 of the opening. In view of the completeness of covering and the easiness of heat bonding and processing, it is preferred that the thicknesses ($t_1$) and ($t_2$) of the film layer portions 12 and 13 be 5 to 1000 μm, especially 20 to 500 μm.

The easily-openable vessel closure of the present invention can be prepared by forming a laminate comprising a can end member and thermoplastic resin film layers heat-bonded to both the inner and outer surfaces of the can end member, in which openings corresponding to the above-mentioned opening of the can end member are formed on the film layers, pushing the end portions of the thermoplastic resin film layers in the molten state into the cut edge of the opening to form a projecting coating heat-bonded to the cut edge of the opening, applying an opening tab to the outer surface of the can end member to cover said opening and heat-bonding the opening tab to the can end member in the portion contiguous to the opening through the above-mentioned thermoplastic resin film layer.

A tapered projection may be formed in the peripheral portion contiguous to the opening by engaging the opening of the can end member with a tapered punch and die to form a projection having the above-mentioned shape.

The present invention will now be described in detail with reference to the following Examples that by no means limit the scope of the invention.

EXAMPLE 1

An electrolytically chromate-treated steel plate having a thickness of 0.23 mm [tinfree steel (TFS) plate; tempering degree of T4CA], on each of both the surface of which a coating having a thickness of 5 μm was formed by coating and baking a lacquer of a mixture of an epoxy resin and a phenolic resin, was prepared. The coated steel plate was formed into a vessel closure-forming member having an outer diameter of 62 mm, and an SBR type sealing compound was coated and dried on a curled peripheral portion to be double-seamed to a can body, whereby a can end member was prepared.

An ellipsoidal opening having a longer diameter of 27 mm was formed in the flat portion by means of a punch and die, whereby a pouring mouth was formed. The position of the opening was such that the center of the ellipsoidal shape was located at the point 6.5 mm apart from the center of the can end member. A polytetramethylene terephthalate/isophthalate film having a thickness of 150 μm and a melting point of 170° C. was punched into an ellipsoidal shape having a longer diameter of 33 mm, which was similar to the shape of said opening and a little larger than the shape of said opening, and the ellipsoidal film was placed on the opening on the surface to be formed into the inner surface of the final vessel. A polytetramethylene terephthalate/isophthalate film having a thickness of 50 μm and a melting point of 170° C. was punched into the same shape as the above-mentioned ellipsoidal shape of the polytetramethylene terephthalate/isophthalate having a thickness of 150 μm, and this ellipsoidal film was placed on the opening on the surface to be formed into the outer surface of the final vessel. Then, both the films were pressed under a pressure of 5.3 Kg/cm² to the can end member in the peripheral portion contiguous to the opening by means of a pressing tool composed of brass, and simultaneously, the peripheral portion contiguous to the opening was heated at 200° C. by high frequency induction heating to heat-bond both the films to the can end member.

The films heat-bonded to the inner and outer surfaces in the peripheral portion oontiguous to the opening were holed by means of a punch and die to form an opening having a similar shape to that of said opening and being a little smaller in the size than said opening, so that a width of 0.5 mm was left inwardly of the cut edge of the opening. In this state, a track-like film having a width of 3.5 mm was fusion-bonded to each of the inner and outer surfaces of the can end member.

A one-side coated aluminum foil having on one surface thereof a resin coating having a thickness of 5 μm, which was formed by coating a solution of a mixture of an epoxy resin and a phenolic resin (epoxy resin/phenolic resin weight ratio=75/25) and baking the coated solution at 230° C. for 30 seconds, was prepared. A biaxially stretched polyethylene terephthalate film having a thickness of 50 μm was applied through an adhesive to the uncoated surface of the aluminum foil, and the laminate was cut into a size of 18 mm (width)×45 mm (length) to form an opening tab. The opening tab was placed on the can end member so that the coated surface covered the hot-adhesive resin layer composed of the polytetramethylene terephthalate/isophthalate, and the opening tab was pressed to the can end member under a pressure of 10 Kg/cm² by a pressing member composed of a heat-resistant rubber. Simultaneously, the peripheral portion contiguous to the opening was heated to 250° C. by high frequency induction heating, whereby the coating applied to the opening tab and the 50 μm polytetramethylene terephthalate/isophthalate film bonded as the hot-adhesive resin layer to the outer surface of the can end member in the peripheral portion contiguous to the opening were fusion bonded and the heat-adhesive resin layer and film layer already bonded to the inner and outer surfaces of the can end member in the portion contiguous to the opening and projected from the cut edge of the opening along the width of 0.5 mm were fusion-bonded to each other. Thus, a thermoplastic resin coating having a-shaped section was formed on the cut edge of the opening.

Separately, a bonded can body for a 200-gram can, which was formed of a TFS plate having a thickness of 0.22 mm and had an inner diameter of 52.3 mm and an ordinary vessel closure double-seamed to the other end was hot-filled with orange juice, and the easily-openable vessel closure of this Example was double-seamed to the can body so that the seaming outer diameter was 55 mm, whereby a canned orange juice drink was prepared.

COMPARATIVE EXAMPLE 1

A can end member was prepared in the same manner as described in Example 1, and an ellipsoidal opening having a longer diameter of 27 mm and a shorter diameter of 5 mm was formed in the flat portion of the can end member by means of a punch and die, whereby a pouring mouth was formed.

A biaxially stretched polyethylene terephthalate film having a thickness of 50 μm was applied through an adhesive to a soft aluminum foil having a thickness of 50 μm, and a polytetramethylene terephthalate/isophthalate film having a thickness of 20 μm and a melting point of 170° C. was fusion-bonded to the other surface of the aluminum foil. The laminate was cut into a size of 11 mm (width)×45 mm (length) to form an opening tab.

The opening tab was placed on the can end member so that the hot-adhesive resin layer of the polytetramethylene terephthalate/isophthalate confronted the outer surface of the can end member in the peripheral portion contiguous to the opening, and the opening tab was pressed under a pressure of 10 Kg/cm² by a pressing member composed of a heat-resistant rubber. Simultaneously, the peripheral portion contiguous to the opening was heated at 250° C. by high frequency induction heating, whereby the hot-adhesive resin layer of the opening tab was heat-bonded to the surface to be formed into the outer surface of the final vessel in the peripheral portion contiguous to the opening along a bonding width 3 mm.

A polypropylene film having a thickness of 20 μm and having on one surface thereof an acrylic adhesive layer having a thickness of 10 μm was cut into a rectangular shape having a width of 9 mm and a length of 31 mm to form a protecting covering film. The covering film was placed on the opening of the above-mentioned vessel closure so that the inner surface of the vessel closure confronted the adhesive layer, and covering film was pressed under a pressure of 5 Kg/cm² by a pressing member composed of a rubbery elastomer so that the adhesive layer adhered closely to the coating on the inner surface of the vessel closure and also to the hot-adhesive resin layer of the opening tab, whereby an easily-openable vessel closure having an opening tab and a protecting coating layer was formed (see FIG. 5).

By using the easily-openable vessel closure prepared in the above-mentioned manner, a canned orange juice drink was prepared in the same manner as described in Example 1.

The packed cans prepared in Example 1 and Comparative Example 1 were subjected to the falling test, and the cans were evaluated in the following manner. The obtained results are shown in Table 1.

LEAKAGE

The packed cans were let to fall down on an iron plate from different heights so that the lids were located on the lower side. Leakage of the content was checked.

RUSTING OF CUT EDGE

The packed cans which had been subjected to the falling test were stored at 37° C. for 1 year, and the lids having the opening tab were separated from the can bodies by using a can opener. In each lid, the state of the protecting coating for the cut edge on the inner surface side of the opening was observed and it was checked whether or not rusting was caused.

TABLE 1

Results of Test of Cans of Example 1 and Comparative Example 1

| Shape of Opening | Shorter Diameter (mm) of Opening | Falling Height (cm) | Leakage | Rusting of Cut Edge |
|---|---|---|---|---|
| Example 1 | | | | |
| case where portion | 3 | 20 | not observed | not observed |
| defined by circle A and | | 40 | observed | not observed |
| contour B of opening does | | 60 | observed | not observed |
| not include circle having | | 80 | observed | observed |
| diameter of 5 mm | 4 | 20 | not observed | not observed |
| | | 40 | not observed | not observed |
| | | 60 | observed | not observed |
| | | 80 | observed | not observed |
| case where portion | 5 | 20 | not observed | not observed |
| defined by circle A | | 40 | not observed | not observed |
| and contour B of | | 60 | not observed | not observed |
| opening includes | | 80 | not observed | not observed |
| circle having | 10 | 20 | not observed | not observed |
| diameter of 5 mm | | 40 | not observed | not observed |
| | | 60 | not observed | not observed |
| | | 80 | not observed | not observed |
| Comparative Example 1 | | | | |
| case where portion | 5 | 20 | not observed | observed |
| defined by circle A and | | 40 | not observed | observed |
| contour B of opening | | 60 | observed | observed |
| does not include circle | | 80 | observed | observed |
| having diameter of 5 mm | | | | |

EXAMPLE 2

An easily-openable vessel closure having an ellipsoidal opening having a longer diameter of 27 mm and a shorter diameter of 10 mm was prepared in the same manner as described in Example 1.

Separately, a vessel closure having an ellipsoidal opening having a long diameter of 27 mm and a shorter diameter of 10 mm was prepared in the same manner as described in Example 1, and the peripheral portion contiguous to the opening was projected outward by using a punch and die to obtain an easily-openable vessel closure in which the peripheral portion of the can end member contiguous to the opening was tapered and projected along a width of 2 mm at a projection angle of 25° from the flat surface.

In the same manner as described in Example 1, cans packed with a fruit juice were prepared and subjected to the falling test. The obtained results are shown in Table 2.

TABLE 2

Results of Test of Cans of Example 2

| Shape of Peripheral Portion contiguous to Opening | Short Diameter (mm) of Opening | Falling Height (cm) | Leakage | Rusting of Cut Edge |
|---|---|---|---|---|
| flat | 10 | 80 | not observed | not observed |
| | | 100 | not observed | not observed |
| | | 120 | observed | not observed |
| | | 140 | observed | not observed |
| tapered and projected outward | 10 | 80 | not observed | not observed |
| | | 100 | not observed | not observed |
| | | 120 | not observed | not observed |
| | | 140 | not observed | not observed |

What is claimed is:

1. An easily-openable vessel closure comprising a can end member having a preformed opening and an easily-tearable opening tab arranged on the outer side of the can end member to cover the opening and adhere closely to the peripheral portion of the can end member contiguous to the opening, wherein the opening of the can end member has such a size and shape that the opening is longer in the radial direction of the can end member, the opening extends from the inside of a circle concentric with the can end member, which has a diameter 0.35 times the seaming diameter of the can end member, to the point close to the outer periphery of the can end member and the portion defined by the contour of the opening and said circle involves a circle having a diameter of 5 mm, and wherein a thermoplastic resin coating having a -shaped section is formed on the cut edge of the opening of the can end member and the contiguous peripheral portion of the can end member and the opening tab is bonded to the can end member through said resin coating.

2. An easily-openable vessel closure as set forth in claim 1, wherein the can end member is tapered and projected outward in the peripheral portion contiguous to the opening and the opening tab is bonded to the can end member at said tapered peripheral portion.

3. An easily-openable vessel closure as set forth in claim 2, wherein the width of the tapered peripheral portion is 0.5 to 5 mm and the projection angle of the tapered peripheral portion is 10° to 40° from the horizontal plane.

* * * * *

UNITED STATES PATENT AND TRADEMARK OFFICE
CERTIFICATE OF CORRECTION

PATENT NO. : 4,526,287
DATED : July 2, 1985
INVENTOR(S) : Miyamatsu et al.

It is certified that error appears in the above-identified patent and that said Letters Patent is hereby corrected as shown below:

IN THE ABSTRACT line 16, delete "a-shaped", insert --a ⊐-shaped--.

IN THE CLAIMS

Claim 1, line 16, delete "-shaped",
insert --⊐-shaped--.

Signed and Sealed this

Twenty-fourth Day of September 1985

[SEAL]

Attest:

Attesting Officer

DONALD J. QUIGG

Commissioner of Patents and
Trademarks—Designate